United States Patent [19]
Gallardo

[11] Patent Number: 5,957,533
[45] Date of Patent: Sep. 28, 1999

[54] ARTICULATED RECLINING BACKREST WITH LUMBAR SUPPORT

[76] Inventor: David Cotero Gallardo, Fuente de Diana No. 248, Colonia Tecamachalco, Huixquilucan, Estado de México, Mexico, 52780

[21] Appl. No.: 08/885,660

[22] Filed: Jun. 30, 1997

[30] Foreign Application Priority Data

Dec. 3, 1996 [MX] Mexico .................................... 971855

[51] Int. Cl.⁶ ....................................................... B60N 2/22
[52] U.S. Cl. ..................................... 297/301.1; 297/284.4; 297/452.3
[58] Field of Search .............................. 297/284.4, 284.1, 297/301.3, 301.1, 452.3, 452.31

[56] References Cited

U.S. PATENT DOCUMENTS

| | | | |
|---|---|---|---|
| 4,333,683 | 6/1982 | Ambasz | 297/301.1 X |
| 4,469,374 | 9/1984 | Kashihara et al. | 297/284.4 |
| 4,564,235 | 1/1986 | Hatsutta et al. | 297/284.4 |
| 4,671,569 | 6/1987 | Kazaoka et al. | 297/284.4 |
| 4,678,230 | 7/1987 | Winkle | 297/284.4 |
| 5,423,593 | 6/1995 | Nagashima | 297/284.4 |
| 5,649,739 | 7/1997 | Zapf | 297/284.4 X |

*Primary Examiner*—Peter M. Cuomo
*Assistant Examiner*—Stephen Vu
*Attorney, Agent, or Firm*—Jagtiani & Associates

[57] ABSTRACT

The present invention provides a backrest for a seat or chair having an upper section; a lower section; and a pivotal movement mechanism fixed to the lower section which pivotably connects the upper section with the lower section and includes spring device for allowing the upper section to pivot to a reclined position when force is applied to the upper section and for urging the upper section into an upright position when force is not applied to the upper section, the pivotal movement mechanism including two vertical members which extend vertically from the lower section, the two vertical members being pivotably connected to an interior portion of the upper section located between said two vertical members.

13 Claims, 8 Drawing Sheets

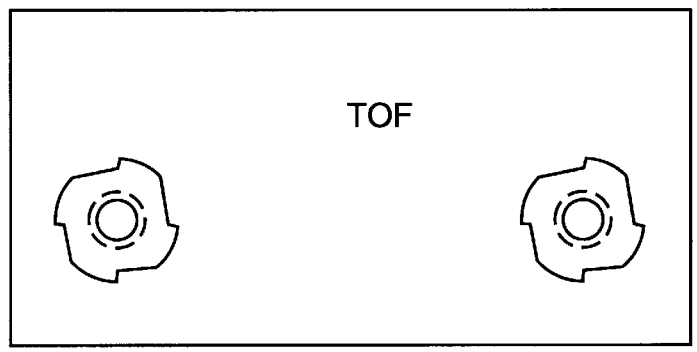 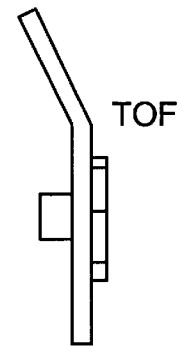
FIG. 5A  FIG. 5B
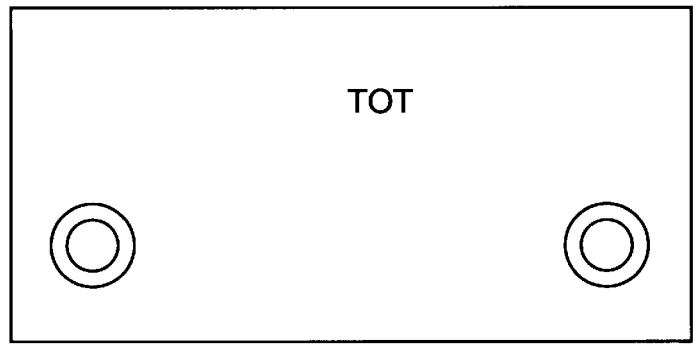 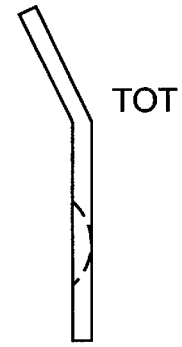
FIG. 5C  FIG. 5D

ARTICULATED RECLINING BACKREST WITH LUMBAR SUPPORT

FIELD OF THE INVENTION

The present invention relates to seats and backrests for general use in chairs or armchairs and more specifically to seats and seat-frames for use in the automobile industry.

BACKGROUND OF THE INVENTION

A constant concern in the field of commonly-used chairs and armchairs for automobiles is that of obtaining designs for backrests and seats which allow the backrest to reach a reclined position while at the same time offering support to the lumbar region of the user, thereby providing a comfortable and safe position for a user's body while preventing positional bad habits and the possibility of traumatism to a user's spine in the case of an accident.

The automotive sector has provided reclining seats with lumbar support, due to the production of new and innovative ergonomic designs, related to the comfort and safety needs of the users of automobiles. These designs include mechanisms which combine several ergonomic factors such as:

a) positioning the seat in relation to the steering-wheel or the vehicle's dashboard.

b) allowing for changeable positions which may be maintained between the elements of the seat-frame, seat and backrest, in order to provide a reclined position, and c) designing the parts of the seat, such as the seat-covers, filling material and solid support elements seat-frame, so as to comfortably situate the body and the forms of the backrest in order to provide lumbar support to the user's spine.

The simultaneous consideration of these ergonomic design factors, has produced mechanisms ranging from the very simple to the most sophisticated with the aim of combining them and obtaining the best possible results. As a result, most of the existing mechanisms are based on the following basic general principles:

a) providing positioning levers which activate wire pulleys or cables which release or halt the sliding of the whole seat on parallel rails, governing the horizontal position of the seat, b) providing positioning levers which activate wire pulleys or cables which release or maintain the vertical position of the backrests to allow the entrance or exit of passengers to and from the back seat of the vehicle, c) adjusting the reclined position in the corresponding vertical position, erect position, of the backrest, by means of positioning levers which when activated or immobilized, allow a variety of reclined positions for the backrest body which pivots on two fixed parallel positions which support the sides of the seat frame. These adjustments may also be achieved by means of a screw mechanism which gradually adjusts the reclined position of the backrest which pivots on two parallel supports placed on the sides of the seat.

All the above mechanisms suffer from problems. For example, it is very common for the lever and pulley system to get stuck or break. If this happens the backrest can be released and deformed, so that a user's spine does not have the necessary lumbar support which would provide it with stability and safety in the event of an accident suffered by the vehicle due to improper driving.

SUMMARY OF THE INVENTION

It is an object of the present invention to provide a reclining backrest with lumbar support, capable of creating conditions of stability, comfort and safety for the spine and body in general of the user.

In view of all of the above problems with existing devices, the inventor of the present invention investigated several alternatives, one of which was considered as being the most attractive from ergonomic, technical and economic viewpoints. The present invention provides a new reclining backrest with lumbar support which does away with the disadvantages of the previous designs. The backrest of the present invention is basically formed by a backrest cut into two sections, where one of the sections is movable and also includes a lumbar support. The other section is fixed to provide stability to the backrest as a whole. Both sections are joined by a pivotal movement mechanism which uses two springs made from a polymeric material with high torsional resistance, in order to provide the backrest with movement, while allowing the backrest to return to its original position when the weight of the user's body is not applied to it.

The reclining backrest with lumbar support of this invention, has the following advantages over the existing designs on the market:

a) it can be manufactured at a lower cost, as the device is made from pieces of stamped steel and the two springs are made from an elastic material with high torsional resistance.

b) the device is activated immediately when a user leans back on it;

c) when activating the device, two benefits are simultaneously provided; the ability to recline and lumbar support;

d) the device requires less maintenance;

e) due to the smaller number of pieces it is very easy to manufacture and assemble the device, and the number of operating faults and maintenance measures is reduced.

Taking into account the disadvantages of the previous designs, the inventor of the present invention carried out a series of studies, tests and experiments which led him to provide a reclining backrest with lumbar support, which is new and innovative.

BRIEF DESCRIPTION OF THE DRAWINGS

The invention will be described in conjunction with the accompanying drawings of preferred embodiment of the invention, in which.

DETAILED DESCRIPTION OF THE PREFERRED EMBODIMENT

Figure 1:
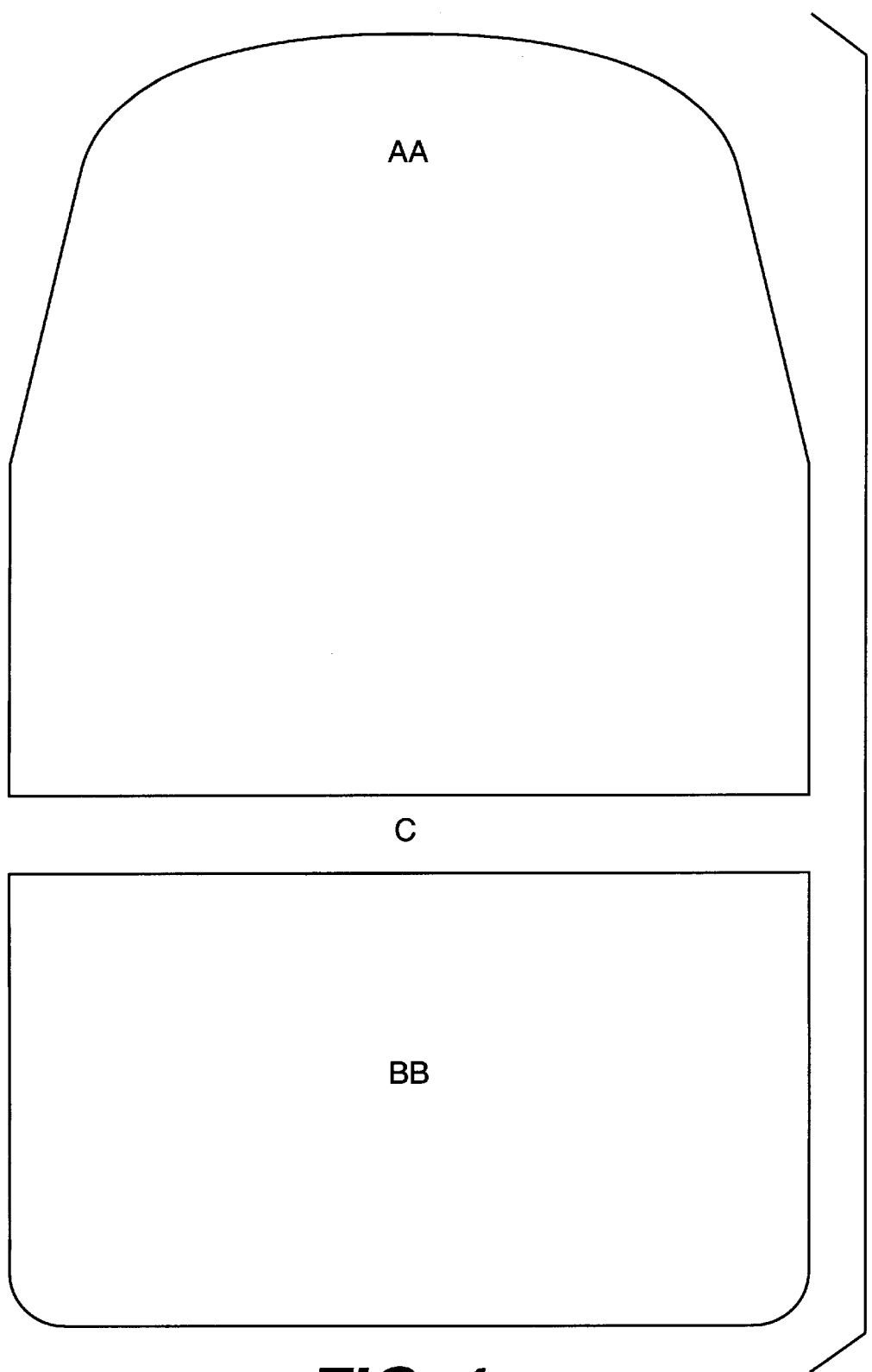
FIG. 1, is a front view of upper and lower sections which form a reclining counter-backrest with lumbar support of the present invention.

In reference to FIG. 1, the reclining backrest with lumbar support of the present invention is formed by a first upper flat section A (shown in FIG. 3) and a second lower flat section B (not shown in FIG. 6) connected by a universal joint mechanism (shown in FIG. 9) located in the space C between both sections A and B. Both sections A and B are reinforced by a counter-backrest divided into two parts: AA and BB formed from sheets of resistant material are joined to upper and lower sections A and B, respectively.

Figure 2:
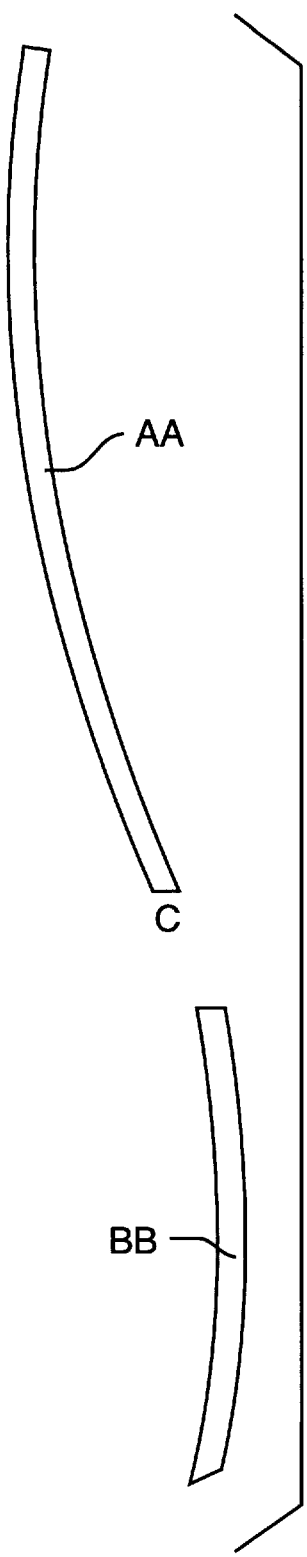
FIG. 2, is a side view of the two backrest sections of the reclining backrest with lumbar support of FIG. 1.

FIG. 2 illustrates a side view of sections AA and BB of the counter-backrest which are joined to the reclining backrest with lumbar support of the present invention formed by a first upper flat section A and a second lower flat section B and connected by a universal joint mechanism (shown in FIG. 9) located in the space C between both sections A and B, both of which have a slightly curved vertical profile.

Figure 3:
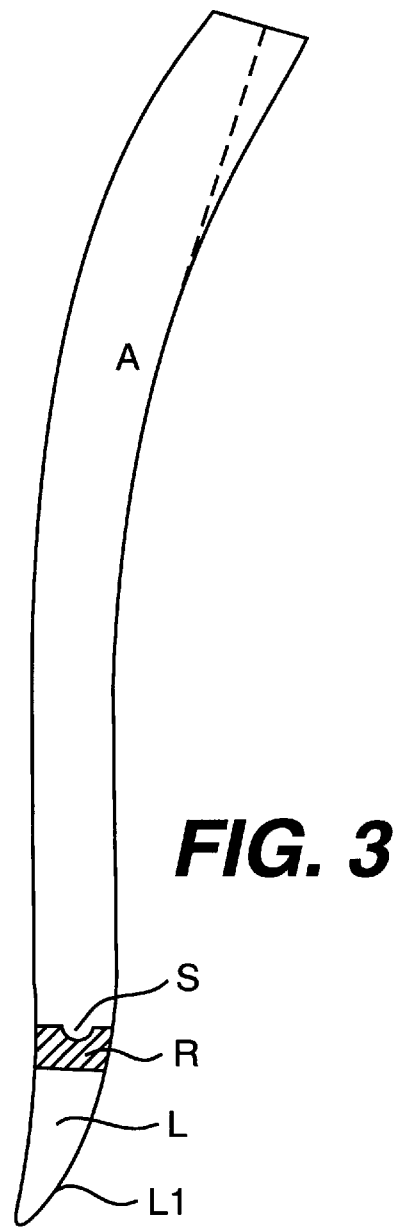
FIG. 3 is a side view of the assembly of the upper section of the backrest of the reclining backrest with lumbar support of FIG. 1.

In reference to FIG. 3, section A of the reclining backrest with lumbar support of the present invention is provided with a pair of lateral rounded profiles S which pivot on a pair of corresponding U-shaped lateral supports R (shown in FIG. 6) located on the top part of the lower section B (shown in FIG. 6) when the user's body (not shown in FIG. 3) leans on the backrest. The upper section A is connected to the lumbar support L by means of nuts and bolts TR1 through TR5 (shown in FIG. 9). When a user's body (not shown in FIG. 3) reclines on the upper section A of the backrest, both section A and support L provide torquing force on the springs Q1 and Q2 (shown in FIG. 9) which are located between the upper section A and lower section B. In turn, lumbar support L is joined at the bottom to lower section B of the reclining backrest, by means of a curved edge L1. Curved edge L1 fits into curved portion B7 (shown in FIG. 6) of lower section B which has a sloped or inclined groove which corresponds to the curved edge L1.

Figure 4:
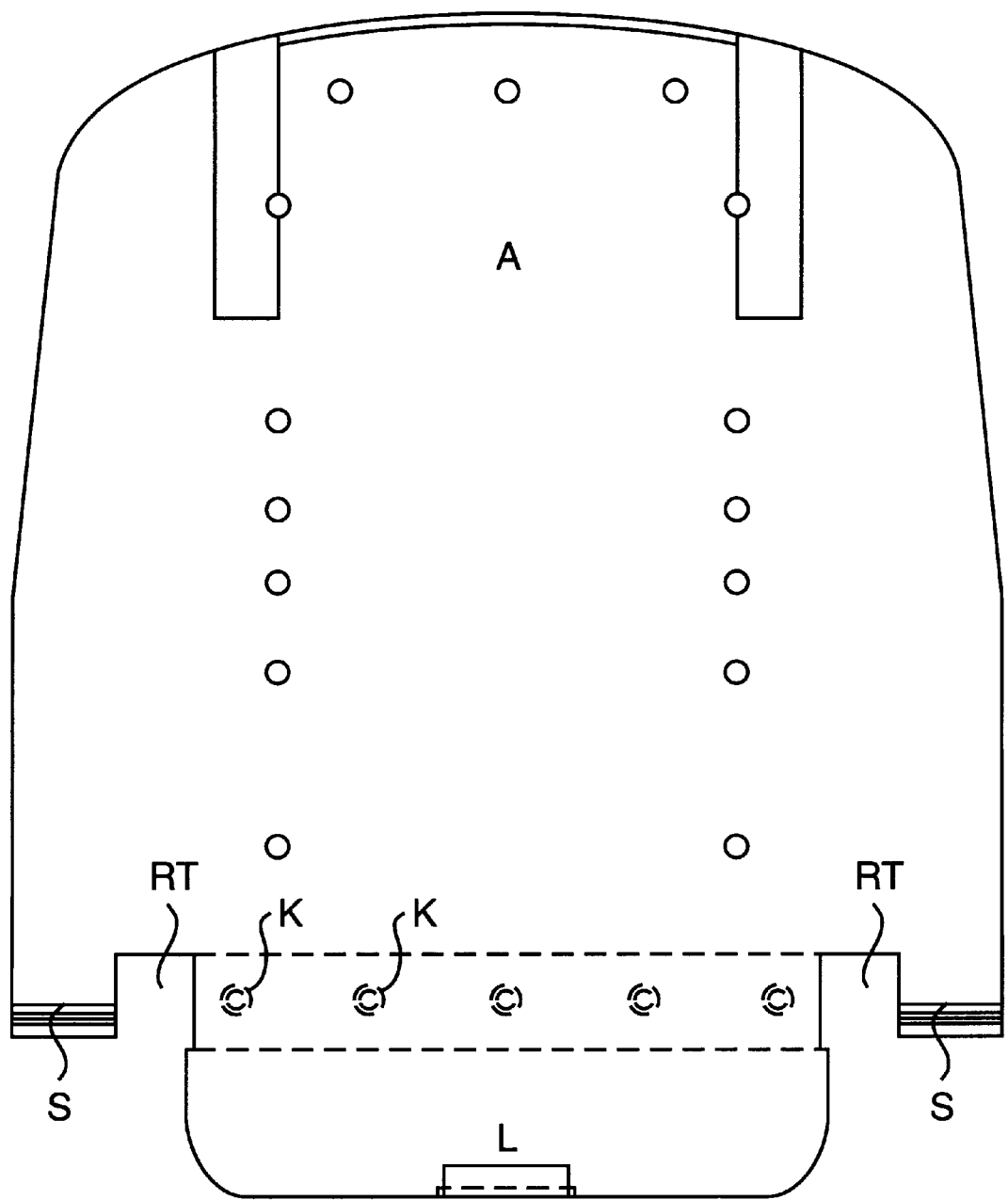
FIG. 4, is a front view of the assembly of the upper section of the reclining backrest with lumbar support of FIG. 1.

Now referring to FIG. 4, the upper section A of the reclining backrest with lumbar support of this invention, is connected to the lumbar support L by means of five or more sets of nuts and bolts TR1 to TR5 (shown in FIGS. 7 and 9) which hold a support SP (shown in FIG. 7) in position. The lower part of upper section A is provided with a rectangular notches RT in which a pair of high resistance springs Q1 and Q2 (shown in FIG. 9) are positioned. Springs Q1 and Q2 allow the pivoting of the upper section A of the backrest on lower section B, by means of the semicircular rounded profiles S provided on both sides of the lower part of section A.

Figure 5:
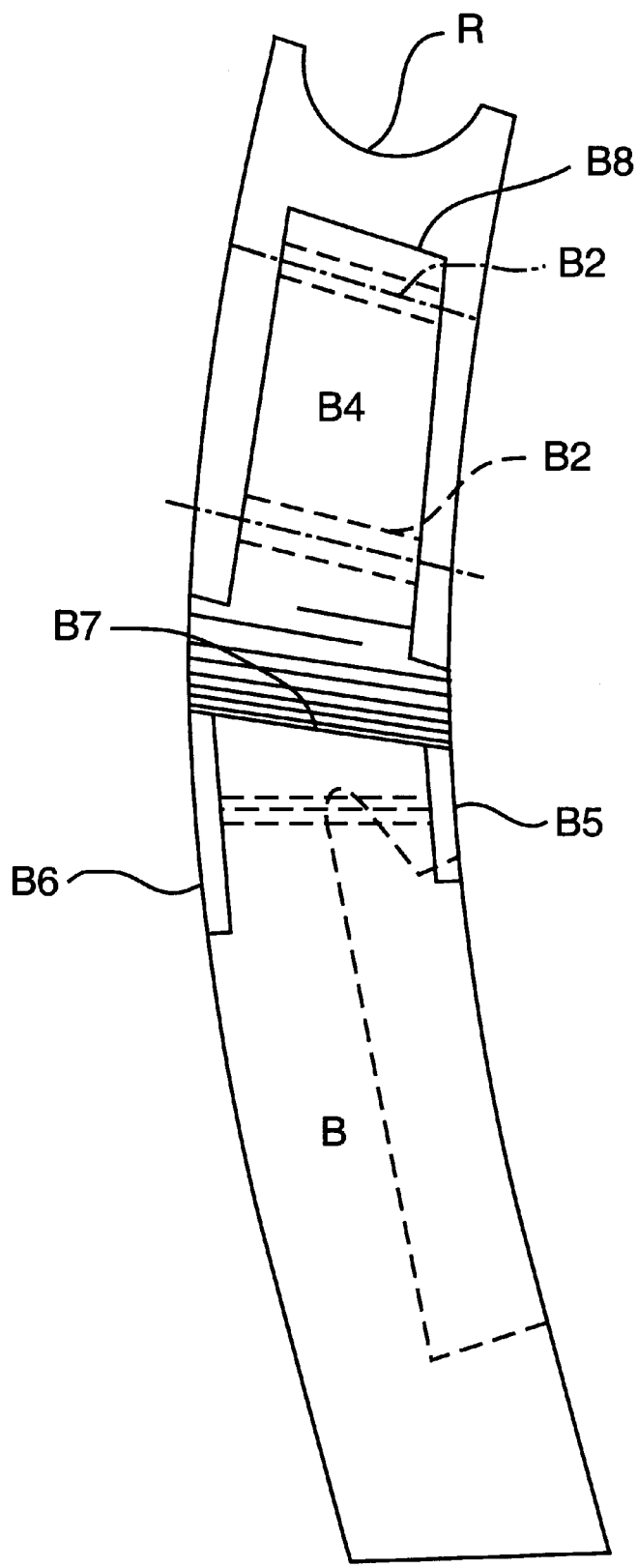
FIG. 5A, is a side view of the assembly of the bottom section of the reclining backrest with lumbar support of FIG. 1.
FIGS. 5B and 5C, illustrate the structure of the frontal stub which holds the upper and lumbar support sections of the reclining backrest with lumbar support of FIG. 1 in position.
FIGS. 5D and 5E, illustrate the structure of the rear stub which holds the upper and lumbar support sections of the reclining backrest with lumbar support of FIG. 1 in position.

Now referring to FIG. 5A, the lower section B of the reclining backrest of this invention, has at the top a pair of semicircular notches R on which the rounded profiles S of the upper section A slide and rotate and when the user's body not shown leans on the upper section. Four metal universal joint supports SR1 SR2, SR3 and SR4 (shown in FIG. 9) are mounted on indented sections B4 of lower support B by nuts and bolts B3 and B2, respectively (of which only bolts B2 are visible in FIG. 5A).

With reference to FIGS. 5B and 5C, these show the structure of a frontal stub TOF, which is provided with an upper flange with a slope of 20° with regards to the vertical axis. Referring to FIGS. 5D and 5E, these show the forms of a rear stub TOT, which is provided with an upper flange with a slope of 18° with regards to the vertical axis. Lumbar support L is has its pivotal motion restrained by means of frontal stub TOF and rear stub TOT which are mounted on notched regions B5 of lower section B (of which only the frontal notched region B5 is visible in FIG. 6).

Figure 6:
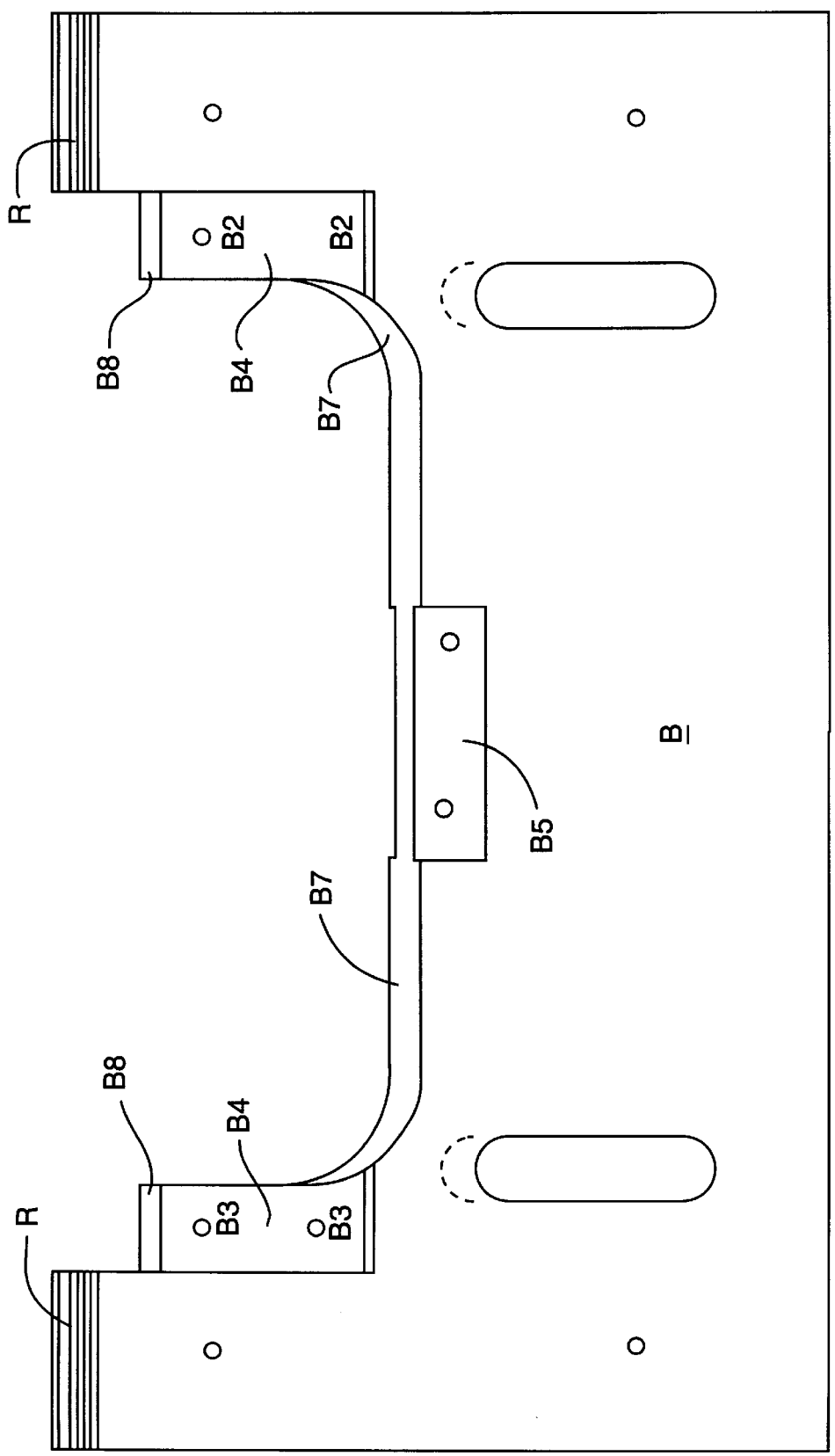
FIG. 6, is a front view of the assembly of the bottom section of the reclining backrest with lumbar support of FIG. 1.
Figure 7:
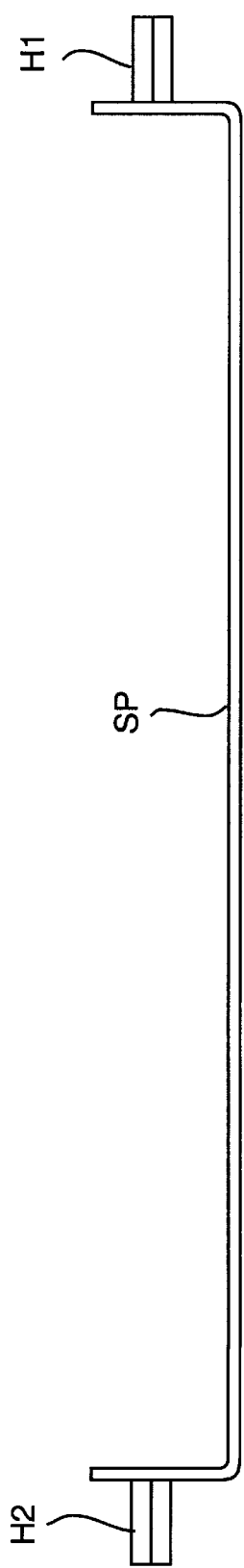
FIG. 7, is a plan view of the universal joint of the reclining backrest with lumbar support of FIG. 1.

Now referring to FIG. 6, the lower part B of the reclining backrest of the present invention is formed by a plate made of a resistant material, provided at the top with two half-round semicircular grooves R on which the upper section A backrest slides and pivots, by means of the rounded profiles S of the upper section A which are shaped to correspond with grooves R, Now with respect to FIG. 7, the U-shaped support SP of the pivotal movement mechanism is made from a resistant material. Hexagonal rods H1 and H2 are mounted on the right angle ends of support SP by soldering. Rods H1 and H2 are inserted into hexagonal holes in springs Q1 and Q2 (shown in FIG. 9). Supported on the hexagonal rods H1 and H2, the springs Q1 and Q2 develop a torquing force against the supports SR1, SR2, SR3 and SR4 (shown in FIG. 9) which are fixed to the lower section B at indented sections B4.

Figure 8:
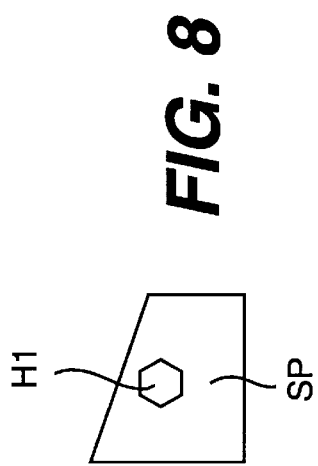
FIG. 8, is a side view of the universal joint mechanism of the reclining backrest with lumbar support of FIG. 1.

FIG. 8 shows the position of the hexagonal rod H1 soldered to the support SP.

Figure 9:
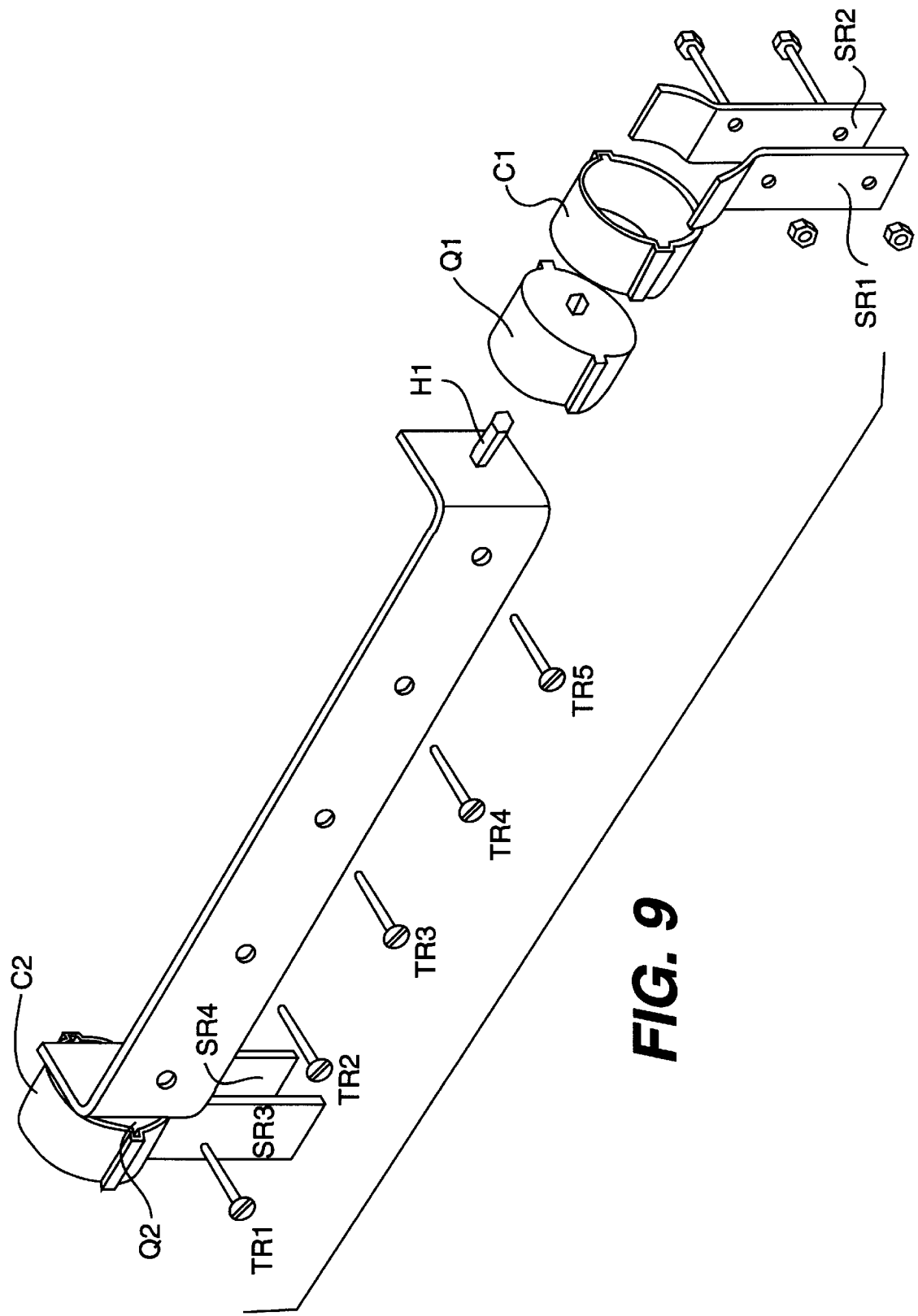
FIG. 9, is an isometric view of the complete universal joint of the reclining backrest with lumbar support of FIG. 1.

Now referring to FIG. 9, the pivotal movement mechanism of the upper part A of the backrest has a universal joint mechanism on the left end of the support SP on the hexagonal rod H2 formed by the universal joint supports SR3 and SR4 which carry a housing C2 which in turn houses the spring Q2. The support SP is joined to the upper section A of the backrest by means of five respective nuts and bolts TR1 to TR5, so that when the user's body is reclines, the support SP tends to pivotally rotate within the body of the springs Q1 and Q2, by means of the hexagonal rods H1 and H2. The bodies of the springs Q1 and Q2 are made from high resistance rubber reinforced with metal springs and are fixed inside the respective housings C1 and C2 which are carried on the supports SR1, SR2, SR3 and SR4 fixed to the lower section B of the backrest, and, therefore tend to oppose the force applied by the user's body.

The lower section B of the backrest couples with and is held in position with the section L of the lumbar support by means of the following mechanism: The upper edges B7 and B8 of lower section B receive, respectively, the edge L1 and the lower edge of the housings C1 and C2. The frontal and rear stubs B5 and B6 maintain section L of the lumbar support in position within the limits defined by the two inclined sides B8 and side B7.

Having described the preferred version of the invention, it is evident to those skilled in the art, that various changes and modifications may be made to this invention without deviating from the spirit, idea and scope of the following claims.

I claim:

1. A backrest for a seat or chair comprising:

an upper section;

a lower section; and a pivotal movement mechanism fixed to said lower section which pivotably connects said upper section with said lower section and includes a spring device for allowing said upper section to pivot to a reclined position when force is applied to said upper section and for urging said upper section into an upright position when force is not applied to said upper section, said pivotal movement mechanism including two vertical members which extend vertically from said lower section, said two vertical member s being pivotably connected to an interior portion of said upper section located between said two vertical members, said interior portion including respective pivot shafts for pivotably engaging respective ones of said vertical members and each of said vertical members having:

a vertical support fixed to said lower section;

a hollow housing mounted on said vertical support; and a spring device mounted in said hollow housing including an opening for engaging a respective one of said pivot shafts to restrain said spring device from rotating relative to said pivot shaft thereby causing said spring device to exert a torsional force on said upper section to urge said upper section towards an upright position when said upper section is in a reclined position, wherein said spring device is cylindrical in shape, comprises a resilient material, and includes at least one raised longitudinal ridge along a cylindrical wall of said spring device; and said hollow housing comprises a cylinder including at least one longitudinal trough for receiving and engaging said longitudinal ridge, said engagement between said at least one longitudinal ridge and said at least one longitudinal trough restraining said spring device from rotating within said hollow housing.

2. The backrest of claim 1, wherein said resilient material comprises rubber.

3. The backrest of claim 1, wherein each said spring device includes at least two raised longitudinal ridges along said cylindrical surface of said spring device and said hollow housing includes two longitudinal troughs, each of said two longitudinal troughs engaging a respective one of said two longitudinal ridges to restrain said spring device from rotating within said hollowing housing.

4. The backrest of claim 1, wherein said pivot shaft and said spring device opening are polygonal in cross section.

5. The backrest of claim 4, wherein said pivot shaft and said spring device opening are hexagonal in cross section.

6. The backrest of claim 1, further comprising a U-shaped plate mounted on said upper section, said U-shaped plate including side portions from which said pivot shafts extend.

7. The backrest of claim 1, wherein said upper section includes two pivotable engagement portions each located outwardly said interior portion of said upper section and said lower section includes two engagement portions each located outwardly of a respective one of said two vertical members for pivotably engaging said pivotable engagement portions of said upper section.

8. The backrest of claim 1, wherein said upper section further comprises a lumbar support region at the bottom of said upper section for providing lumbar support to a user's spine when said upper section of said backrest is in a reclined position.

9. The backrest of claim 1, wherein said backrest comprises a seat for a motor vehicle.

10. A backrest for a seat or chair comprising:

an upper section;

a lower section; and a pivotal movement mechanism fixed to said lower section which pivotably connects said upper section with said lower section and includes a spring device for allowing said upper section to pivot to a reclined position when force is applied to said upper section and for urging said upper section into an upright position when force is not applied to said upper section, said pivotal movement mechanism including two vertical members which extend vertically from said lower section, said two vertical members being pivotably connected to an interior portion of said upper section located between said two vertical members, wherein said upper section includes two pivotable engagement portions each located outwardly said interior portion of said upper section and said lower section includes two engagement portions each located outwardly of a respective one of said two vertical members for pivotably engaging said pivotable engagement portions of said upper section, and wherein said pivotable engagement portions of said upper section comprise half-cylinders and said pivotable engagement portions of said lower section comprise half-cylindrical troughs.

11. A backrest for a seat or chair comprising:

an upper section;

a lower section; and a pivotal movement mechanism fixed to said lower section which pivotably connects said upper section with said lower section and includes a spring device for allowing said upper section to pivot to a reclined position when force is applied to said upper section and for urging said upper section into an upright position when force is not applied to said upper section, said pivotal movement mechanism including two vertical members which extend vertically from said lower section, said two vertical members being pivotably connected to an interior portion of said upper section located between said two vertical members, wherein said upper section includes a lumbar support region at the bottom of said upper section for providing lumbar support to a user's spine when said upper section of said backrest is in a reclined position, wherein said lower section includes front and rear stubs which extend vertically from respective front and rear faces of said lower section, and wherein at least portion of said lumbar support extends between said front and rear stubs and said front and rear stubs restrain the pivotal motion of said lumbar support when said upper section reclines.

12. The backrest of claim 11, wherein each said vertically extending stubs comprise a vertical portion mounted on said lower section and an angled flange which extends from said vertical portion at an angle and which restrains the pivotal motion of said lumbar support.

13. The back rest of claim 12, wherein said front stub has an angled flange which is angled at 20° with respect to said vertical portion of said front stub and said rear stub has an angled flange which is angled at 18° with respect to said vertical portion of said rear stub.

* * * * *